Figure 1:
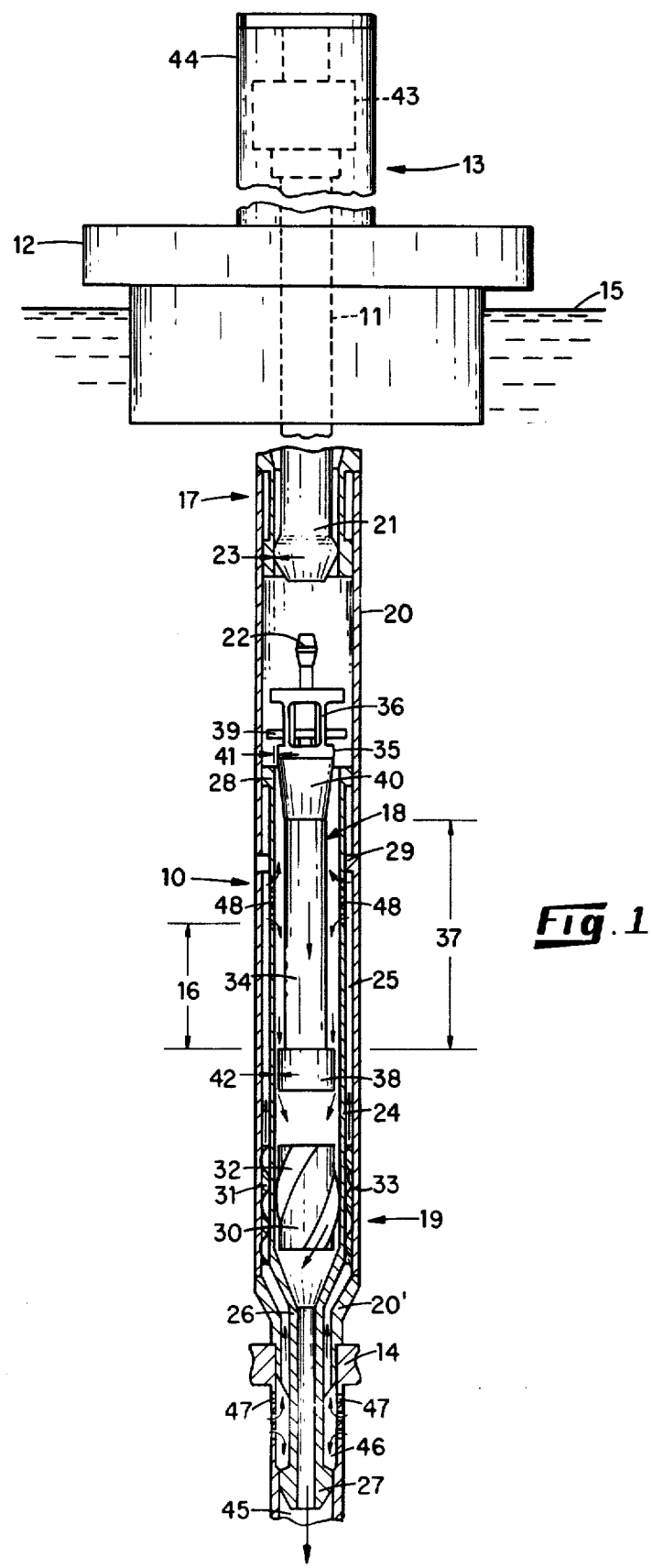

United States Patent [19]

McKeehan et al.

[11] 3,933,581

[45] Jan. 20, 1976

[54] CONTROL ROD DRIVE FOR REACTOR SHUTDOWN

[75] Inventors: Ernest R. McKeehan, Los Gatos; Bruce M. Shawver; Donald J. Schiro, both of San Jose; William E. Taft, Los Gatos, all of Calif.

[73] Assignee: The United States of America as represented by the United States Energy Research and Development Administration, Washington, D.C.

[22] Filed: June 4, 1974

[21] Appl. No.: 476,173

[52] U.S. Cl............. 176/36 R; 176/36 S; 176/86 R
[51] Int. Cl.² ...................... G21C 7/12; G21C 7/16
[58] Field of Search.... 176/36 R, 36 S, 36 C, 36 W, 176/86 R

[56] References Cited
UNITED STATES PATENTS

| | | |
|---|---|---|
| 2,994,655 | 8/1961 | Taylor, Jr. ...................... 204/193.2 |
| 3,728,219 | 8/1971 | Mattern et al. ................... 176/36 R |
| 3,733,251 | 5/1973 | Gilbertson et al. ............... 176/36 R |
| 3,746,615 | 7/1973 | Rottger et al. .................... 176/36 R |

Primary Examiner—Harvey E. Behrend
Assistant Examiner—Ralph Palo
Attorney, Agent, or Firm—Dean E. Carlson; F. A. Robertson; L. E. Carnahan

[57] ABSTRACT

A means for rapidly shutting down or scramming a nuclear reactor, such as a liquid metal-cooled fast breeder reactor, and serves as a backup to the primary shutdown system. The control rod drive consists basically of an in-core assembly, a drive shaft and seal assembly, and a control drive mechanism. The control rod is driven into the core region of the reactor by gravity and hydraulic pressure forces supplied by the reactor coolant, thus assuring that common mode failures will not interfere with or prohibit scramming the reactor when necessary.

5 Claims, 2 Drawing Figures 3,933,581

CONTROL ROD DRIVE FOR REACTOR SHUTDOWN

BACKGROUND OF THE INVENTION

The invention described herein was made in the course of, or under, Contract No. AT(04-3)-893, Task 7, with the U.S. Atomic Energy Commission.

This invention relates to control systems for nuclear reactors, and particularly to pneumatically actuated rapid reactor shutdown systems which hold control rods withdrawn from the reactor core until a scram signal is received whereupon the control rods are released and driven into the core by gravity and hydraulic pressure forces.

Power generation in a nuclear reactor is accomplished by initiating a self-sustaining chain reaction. The amount of fissionable fuel used in the chain reaction is such that the multiplication factor (ratio of neutrons produced by fission in each generation to the number of neutrons in the preceding generation) can be made more than unity. To control this multiplication factor, control rods are used to absorb neutrons within the reactor.

Control rods perform three fundamental functions. The rods must first provide a general reactivity level control to regulate power output of the reactor. Secondly, control rods must provide fine control of reactivity within very small increments to compensate for drifts in reactor operating conditions. The third function of control rods is to rapidly reduce the reactivity level within the reactor to below the critical self-sustaining level in the event of certain particular malfunctions. The control rod functions are generally accomplished by a series of long, reciprocating rods of uniform design arranged in spaced, parallel relationship, each rod being capable of performing all three functions depending upon the particular drive associated therewith. Such control rod systems are generally referred to as the primary control system and functions during normal operating and shutdown conditions.

Under certain conditions, referred to as scram conditions, rapid shutdown of the reactor is required. This rapid shutdown capability is dependent therefor on the control system, and thus a fail-safe control system is required. This requirement is of particular importance for liquid metal-cooled fast breeder reactors (LMFBR). In view of the possibility of the primary control system becoming damaged or otherwise inoperable, backup or alternate shutdown control systems have been utilized which hold control rods in a "cocked" position above the reactor core, whereupon they can be inserted into the core upon scram conditions should the primary control system fail or if additional neutron absorbing rods are required or desired. These prior art backup control systems are exemplified by U.S. Pat. No. 3,535,206, issued Oct. 20, 1970, and U.S. Pat. No. 3,733,251, issued May 15, 1973. Also, Nuclear Science Abstract No. 26,727, Vol. 27, No. 11, page 2540, dated June 15, 1973, based on Report GEAP-13824-3 describes an early approach to an alternate or backup control rod drive system.

While these prior control systems provide effective scram control, the complexity thereof increases the probability of failure or malfunction, whereby a need still exists for a relatively simple but reliable and fast-acting means of scramming a reactor.

SUMMARY OF THE INVENTION

The present invention provides a reliable and fast-acting means of scramming a reactor. The principle of operation is completely diverse from currently known control drives. This diversity ensures that common mode failures will not interfere with or prohibit scramming the reactor when necessary. This backup or alternate shutdown control rod drive of this invention basically consists of an in-core assembly, a drive shaft assembly, and a control drive mechanism, the control rods being released by a pneumatically actuated latch mechanism and driven into the reactor core by gravity and hydraulic pressure forces from the reactor coolant.

Therefore, it is an object of this invention to provide an alternate shutdown system control rod drive for nuclear reactors.

A further object of the invention is to provide a control rod drive system for scram conditions of a nuclear reactor wherein the control rods are inserted into the reactor core by gravity and hydraulic pressure forces supplied by the reactor coolant.

Another object of the invention is to provide a reliable and fast-acting means of scramming a reactor which includes an in-core assembly, a drive shaft assembly, and a control drive mechanism.

Another object of the invention is to provide an alternate shutdown system for a liquid metal-cooled fast breeder reactor wherein control elements are normally retained in a full-out position by a pneumatically actuated latch, and are inserted into the reactor core by depressurizing the latch pneumatic actuator thereby releasing the elements allowing same to be driven into the core by gravity and hydraulic pressure forces from the coolant pressure drop across the core.

Other objects of the invention will become apparent from the following description and accompanying drawings.

BRIEF DESCRIPTION OF THE INVENTION

Figure 2:
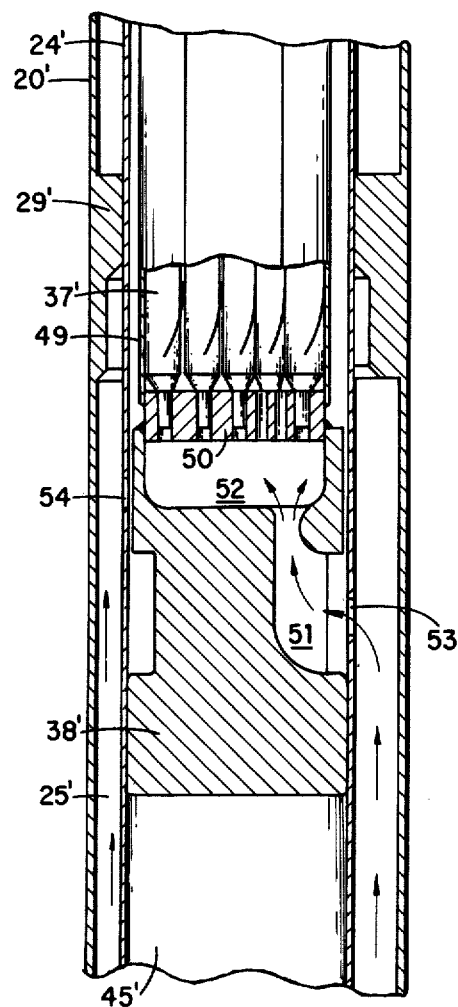

FIG. 1 is a view, partially in cross-section, illustrating the inventive control rod drive system; and FIG. 2 is a partial cross-sectional view of an embodiment of a modified control element for the FIG. 1 system.

DESCRIPTION OF THE INVENTION

The invention is directed to an alternate shutdown system for nuclear reactors, and is particularly applicable to liquid metal-cooled fast breeder reactors (LMFBR). The reactor shutdown or scramming system involves a control rod drive consisting basically of an in-core or in-vessel assembly, a drive shaft and seal assembly, and a control drive mechanism, the in-core assembly being constructed such that the control rod when the system is activated is driven into the core region by gravity and hydraulic pressure forces supplied by the reactor coolant.

Referring now to FIG. 1, the embodiment illustrated comprises three general assemblies, composed of an in-core or in-vessel assembly 10, a drive shaft assembly indicated by dash lines at 11 connected to assembly 10 and extending through a reactor closure 12, and a control drive assembly 13 mounted on closure 12 and connected to drive shaft assembly 11, in-core assembly 10 extending into a core support structure 14. Reactor closure 12 is mounted in a reactor vessel (not shown) containing liquid sodium of a level indicated at 15 which is circulated through a reactor core indicated diagrammatically at 16 by pumping mechanism and coolant flow channels, not shown, the core 16 containing fuel elements and control elements, as known in the art, and in which is located in-core assembly 10.

In-core or in-vessel assembly 10 constitutes a control assembly located within sodium coolant 15 and comprises generally a latch section 17, a control element section 18 and a shielding section 19 enclosed within an outer casing or channel 20 terminating at the upper end below reactor closure 12 and having a reduced diameter lower end portion 20' which extends into reactor core support structure 14. Casing 20 may be of a hexagonal configuration.

Latch section 17 is mounted in the upper end of casing 20 and is part of the driveline of assembly 11 and surrounds a latch mechanism generally indicated at 21 for retaining and releasing a coupling head 22 of control element section 18. Latch mechanism 21 is preferably of the pneumatically actuated type utilizing gripper elements, not shown, to releasably retain coupling head 22 therein, and may, for example, be of the type described and claimed in copending U.S. patent application Ser. No. 476,184 filed June 4, 1974 in the name of M. L. Johnson et al entitled "Quick Release Latch for Reactor Scram" and assigned to the same assignee. The latch mechanism 21 is constructed to define a latch annulus 23 for purposes described hereinafter.

Mounted within casing 20 and in spaced axial relation with respect to latch mechanism 21 is a guide tube 24 which is secured within casing 20 and forms with the adjacent internal wall surface of casing 20 an annulus or space 25 through which coolant flows as discussed below. A lower end portion 26 of guide tube 24 is formed of a smaller diameter and of greater wall thickness and is provided at the end with a radially protruding section 27 which cooperates with core support structure 14 to prevent coolant flow between high and low pressure coolant as described hereinafter. In actual practice, if desired, and not shown, a seal or O-ring may be secured in the periphery of protruding section 27 to assure a fluid seal. Guide tube 24 is circular in cross section and is provided at the upper end thereof with a radially outward protruding flange-like member defining a down stop 28 and is secured to outer casing 20. Outer casing 20 is provided with an inwardly projecting portion or member 29 which abuts against guide tube 24 and forms a support therefor while serving as a coolant flow blockage member in annulus 25.

Shielding section 19 is composed of shielding members 30 and 31 positioned respectively within guide tube 24 and annulus 25 adjacent reduced diameter lower end portion 26 of guide tube 24. Shielding members 30 and 31 are constructed from suitable neutron shielding material and are provided with helical grooves or passages 32 and 33, respectively, to provide coolant flow paths therethrough.

Control element section 18, in addition to guide tube 24 includes a control element movably located therein, generally indicated at 34, which is composed of coupling head 22, a damper mechanism 35 connected via a support structure 36 to coupling head 22, a control rod region 37 containing neutron absorbing material secured to damper mechanism 35, and a piston 38 connected to control rod region 37.

Damper mechanism 35 provides for deceleration of the control element 34 at the end of the scram stroke without creating large deceleration force and may, for example, be of the type described and claimed in copending U.S. patent application Ser. No. 476,183, filed June 4, 1974 in the name of W. E. Taft entitled "Damper Mechanism for Nuclear Reactor Control Elements", and assigned to the same assignee, wherein a spring hydraulic damper assembly having a spider 39 is mounted within a tapered dashram assembly 40 which cooperates with down stop 28 to define a damper annulus 41, the function of which is described hereinafter.

Piston 38 is of a larger diameter than control rod region 37 and defines with guide tube 24 a piston annulus 42, the function of which is described below. While not shown, piston 38 is provided with fluid openings or passages through which coolant flows into the lower end of control rod region 37 for cooling same and discharges therefrom in the upper end of region 37, as will become more apparent from the description of the FIG. 2 embodiment.

While not shown, outer casing 20 terminates in spaced relation with respect to the lower surface of reactor closure 12 while drive shaft assembly 11 extends downwardly through closure 12 and is operatively connected at the lower end thereof to actuate latch mechanism 21, whereby the closure 12 can be removed without withdrawing in-core assembly 10. Drive shaft assembly 11 is connected at the upper end thereof to control drive assembly 13 including a thread screw drive motor with position indicated generally at 43 and mounted within a housing 44. While the details of drive shaft assembly 11 and control drive assembly 13 do not constitute part of this invention, the general operation is similar to that set forth in the above-referenced Nuclear Science Abstract except that in this embodiment, a pneumatic actuator for latch mechanism 21 is preferred instead of the electromagnetic actuator system disclosed in the Abstract. Also, report GEAP-13824-6 entitled "LMFBR Alternate Shutdown System Development and Testing" illustrates schematically the pneumatic actuator arrangement as well as details of the control drive assembly 13.

The control element 34, during normal reactor operation, is held in its raised or full-out (ready-to-scram) position by head 22 being retained in activated latch mechanism 21 whereby the control rod region 37 of control element 34 is removed from the reactor core 16. Upon an emergency or scram condition the latch mechanism 21 is deactivated by depressurizing the latch pneumatic actuator thereby releasing the coupling head 22 of control element 34 allowing it to be driven into the core of the reactor by gravitational force and by hydraulic pressure forces (from the coolant pressure drop across the core) acting on the control element piston 38, as described in greater detail hereinafter.

During scram conditions and prior to the damping action provided by damper mechanism 35, control element 34 is accelerated downward within guide tube 24 by gravity and pressure forces across piston 38. The piston's lower surface is exposed to pressure vented, as indicated by arrows, to a reactor low pressure plenum indicated at 45, via grooves 32 in shielding material 30 and the reduced diameter portion 26 of guide tube 24; while the region above piston 38 contains pressure ducted from a reactor high pressure plenum indicated at 46. The coolant from high pressure plenum 46 passes, as indicated by arrows, through apertures or openings 47 in core support structure 14, upwardly along annulus 25, through helical grooves 33 in shielding material 31, and through openings or apertures 48 in guide tube 24 located adjacent the control rod region 37 below protruding member 29 of outer casing 20, into guide tube 24 and about control element 34 and into the inside of the outer casing 20 below the latch annulus 23, applying high pressure on the upper surface of piston 38. With latch mechanism 21 being located so as to create latch annulus 23 a flow restriction is formed that allows enough fluid therethrough to allow normal coolant flow through the control rod region 37 of control element 34, but which is restrictive enough to maintain a high pressure within the inside of the outer casing 20 below the latch annulus 23 and the guide tube 24 acting on the upper surface of the piston 38.

During the downward scram stroke of the control element 34, coolant must flow into the casing 20 volume between latch mechanism 21 and control element 34 to backfill the swept volume within the guide tube 24 by the moving control element. Before the tapered dashram assembly 40 of damper mechanism 35 enters the inside diameter of down stop 28, a generous flow area is provided through the control rod region 37 to supply the backfill flow. However, when the tapered dashram assembly 40 enters the down stop 28 inside diameter, the backfill flow is progressively reduced by the tapered surface of the dashram assembly. This reduction of the backfill flow will reduce the pressure in the region above the down stop 28, and thus decelerate the control element, the final damping being carried out by damper mechanism 35.

It is thus seen that approximately the full core pressure drop in the downward (scram) direction exists across the control element piston 38 continuously during normal operation. Upon receipt of a scram signal, the control element 34 is released by depressurization of the latch mechanism 21 actuating cylinder and is forced down by the hydraulic pressure force and gravity into the core region. Coincident with initiating a scram, the primary coolant pumps are tripped (turned off); however, the transient pressure decay is relatively slow with respect to the control mechanism scram speed, so that sizable scram-assist pressure forces exist throughout the scram stroke. This same relatively slow decay of the primary coolant pressure occurs during normal pump coast-down.

As pointed out above the latch mechanism 21 is deactivated to release the control element 34 by venting the pressure in an associated pneumatic cylinder. While the pneumatic actuator has not been illustrated, the actuator arrangement described in the above-mentioned copending application Ser. No. 476,184 in the name of M. L. Johnson et al may be utilized. Also, as described in detail in the copending application, to retrieve the control element 34 from the full-in or scram position, the latch mechanism 21 is lowered by lead screw device 43 of control drive assembly 13 via drive shaft assembly 11, such that latch mechanism is positioned about coupling head 22 of control element 34. Upon engagement of the latch mechanism with the control element, the pneumatic cylinder is pressured to secure the control element in the latch mechanism. The lead screw device 43 is then actuated to raise the control element slowly out of the core region to its normal full-out position.

Before rotation of the closure 12 or at normal reactor shutdown, the control element 34 could be scrammed or slowly driven into the core region. For closure rotation the control element would be released, and the drive shaft 11 below the closure would be withdrawn well into the closure to provide protection for it during closure motion.

FIG. 2 illustrates an enlarged modified embodiment of the lower portion of the control element and associated structure, and like components will be given similar reference numerals. A control assembly guide tube 24' is positioned in outer casing or channel 20' defining an annulus or high pressure plenum 25' therebetween which is terminated at the upper end by inwardly projecting member 29'. Control rods 37' are retained within a control rod wrapper 49 which is secured through a multi-apertured member 50 to piston 38' having fluid passage 51 and fluid plenum 52 therein allowing coolant to pass from annulus 25' through multi-apertured member 50 into the control rods. Guide tube 24' is provided with a plurality of ports 53 (only one shown) which direct coolant into piston passage 51. Upon downward movement of the control element a scram port 54 in guide tube 24', normally covered by piston 38' allows high pressure coolant from annulus 25' to be directed onto the upper surface of piston 38' applying a downward force thereon for driving the control element into the reactor core. It should be noted that while scram port 54 may improve performance, it is not necessary for operation and thus can be eliminated.

It has thus been shown that the present invention provides a reliable and fast-acting control rod drive for scramming a reactor. The principle of operation of this drive is completely diverse from currently employed control drives. This diversity ensures that common mode failures will not interfere with or prohibit scramming the reactor, thus substantially advancing the state of this art.

While particular embodiments have been illustrated or described, modifications will become apparent to those skilled in the art, and it is intended to cover in the appended claims all such modifications as come within the spirit and scope of the invention.

What we claim is:

1. In combination, a control rod drive for scramming a nuclear reactor comprising: a control rod assembly; a latch mechanism for retaining and releasing said control rod assembly; a drive shaft assembly operatively connected to said latch mechanism; and a control drive assembly operatively connected to said drive shaft assembly, said control rod assembly and said latch mechanism being positioned within an outer casing extending through a reactor core; said drive shaft assembly extending through a reactor closure; and said control drive assembly being located on a side of said reactor closure opposite said outer casing; said control rod assembly being composed of a control rod region, a piston connected at one end of said control rod region and having a cross-section larger than an adjacent cross-section of said control rod region, a damper mechanism connected to said control rod region at an end opposite said piston, and a coupling head connected to said damper mechanism, said coupling head being releasably retained in said latch mechanism; said control rod assembly being movably positioned within a guide tube mounted within said outer casing and defining a high pressure fluid annulus therebetween, wherein fluid passes from the high pressure plenum through apertures in the core support structure and flows upwardly along said annulus, said fluid being vented through apertures in said guide tube located adjacent the control rod region and into the upper portion of said control rod region, said fluid passing therethrough for cooling said control rod assembly during normal operating conditions and for producing hydraulic pressures on the upper surface of said piston of said control assembly for driving said control rod assembly into the reactor core upon release of said control assembly by said latching mechanism, and said fluid thereafter passing through openings in said piston into the lower end of the control rod region and being vented to the low pressure plenum.

2. The control rod drive defined in claim 1, wherein said control drive assembly includes means for lowering and raising said latch mechanism for retrieving said control rod assembly.

3. The control rod drive defined in claim 1, wherein said damper mechanism includes a tapered portion which cooperates with a down stop member on said guide tube for decelerating downward movement of said control rod assembly.

4. The control rod drive defined in claim 1, additionally including shielding material positioned in said guide tube and in said high pressure fluid annulus at a location spaced from said piston of said control rod assembly, said shielding material being provided with helical passages to allow fluid to pass therethrough.

5. The control rod drive defined in claim 1, wherein said piston of said control rod assembly is provided with at least one fluid passage through which fluid passes into said control rod region of said control rod assembly.

* * * * *